(12) United States Patent
Sawant et al.

(10) Patent No.: US 11,941,494 B2
(45) Date of Patent: Mar. 26, 2024

(54) NOTEBOOK INTERFACE FOR AUTHORING ENTERPRISE MACHINE LEARNING MODELS

(71) Applicant: ADOBE INC., San Jose, CA (US)

(72) Inventors: Pari Sawant, Milpitas, CA (US); Shankar Srinivasan, San Ramon, CA (US); Nirmal Mani, Sunnyvale, CA (US)

(73) Assignee: ADOBE INC., San Jose, CA (US)

( * ) Notice: Subject to any disclaimer, the term of this patent is extended or adjusted under 35 U.S.C. 154(b) by 1028 days.

(21) Appl. No.: 16/410,416

(22) Filed: May 13, 2019

(65) Prior Publication Data

US 2020/0364606 A1   Nov. 19, 2020

(51) Int. Cl.
| | |
|---|---|
| *G06N 20/00* | (2019.01) |
| *G06F 8/30* | (2018.01) |
| *G06F 8/61* | (2018.01) |
| *G06F 8/71* | (2018.01) |
| *G06F 16/18* | (2019.01) |

(52) U.S. Cl.
CPC .............. *G06N 20/00* (2019.01); *G06F 8/31* (2013.01); *G06F 8/64* (2013.01); *G06F 8/71* (2013.01); *G06F 16/1873* (2019.01)

(58) Field of Classification Search
CPC ....... G06N 20/00; G06F 16/1873; G06F 8/31; G06F 8/30; G06F 8/36; G06F 8/51; G06F 8/52; G06F 8/64; G06F 8/71
USPC .......................................................... 706/12
See application file for complete search history.

(56) References Cited

U.S. PATENT DOCUMENTS

| | | | |
|---|---|---|---|
| 10,891,393 B2* | 1/2021 | Currier | G06F 21/6245 |
| 11,099,819 B1* | 8/2021 | Fontecilla | G06F 9/451 |
| 11,169,798 B1* | 11/2021 | Palmer | G06F 16/9024 |
| 11,269,820 B1* | 3/2022 | Mahowald | G06F 30/00 |
| 11,315,039 B1* | 4/2022 | Elprin | G06F 8/60 |
| 11,334,807 B1* | 5/2022 | O'Shea | G06N 20/00 |
| 2016/0011905 A1* | 1/2016 | Mishra | G06F 8/34 |
| | | | 718/102 |
| 2016/0012350 A1* | 1/2016 | Narayanan | G06F 9/4484 |
| | | | 706/12 |
| 2016/0350105 A1* | 12/2016 | Kumar | G06F 8/74 |
| 2018/0012145 A1* | 1/2018 | Maurya | G06F 3/048 |
| 2018/0101529 A1* | 4/2018 | Karpistsenko | G06F 16/1873 |
| 2019/0042290 A1* | 2/2019 | Bailey | G06F 8/31 |
| 2019/0155633 A1* | 5/2019 | Faulhaber, Jr. | G06N 5/04 |
| 2019/0278933 A1* | 9/2019 | Bendory | G06F 8/70 |
| 2019/0385052 A1* | 12/2019 | Bauer, Jr. | G06N 7/01 |
| 2020/0125482 A1* | 4/2020 | Smith | G06N 3/045 |

(Continued)

*Primary Examiner* — Jason D Mitchell
(74) *Attorney, Agent, or Firm* — F. CHAU & ASSOCIATES, LLC

(57) ABSTRACT

Systems and methods for developing enterprise machine learning (ML) models within a notebook application are described. The system may include a notebook application, a packaging service, and an online ML platform. The method may include initiating a runtime environment within the notebook application, creating a plurality of files based on a notebook recipe template, generating a prototype model within the data science notebook application by accessing the plurality of files through the runtime environment, generating a production recipe including the runtime environment and the plurality of files, and publishing the production recipe to the online ML platform.

19 Claims, 6 Drawing Sheets

(56) References Cited

U.S. PATENT DOCUMENTS

| | | | | |
|---|---|---|---|---|
| 2020/0184379 | A1* | 6/2020 | Dong | G06N 5/01 |
| 2020/0293354 | A1* | 9/2020 | Song | G06F 8/71 |
| 2020/0356895 | A1* | 11/2020 | Ong | G06N 20/00 |
| 2020/0372307 | A1* | 11/2020 | Arun | G06F 3/0482 |
| 2020/0380417 | A1* | 12/2020 | Briancon | G06N 20/20 |
| 2022/0138004 | A1* | 5/2022 | Nandakumar | G06N 20/00 |
| | | | | 718/102 |

* cited by examiner

NOTEBOOK INTERFACE FOR AUTHORING ENTERPRISE MACHINE LEARNING MODELS

BACKGROUND

The following relates generally to developing machine learning (ML) models, and more specifically to developing ML models within a notebook application for use on a large-scale enterprise platform.

Machine learning models may be used to make predictions based on input data in a wide variety of applications. Developing a ML model is a highly iterative process of writing, editing, re-writing, and testing configurations, algorithms, and model parameters. The process includes the stages of acquiring and exploring data, identifying features of the data, creating a model, evaluating the model, making predictions, and developing insights based on the model. Using a notebook application during the development of a ML model helps data scientists to document, visualize, and iterate the code they have written.

Upon building a prototype ML model, it is often desirable to implement the model on a large-scale enterprise platform, such as Adobe Experience Platform®, allowing the data scientists and other users to deploy functionalities and capabilities such as running multiple experiments and deriving insights from large datasets that are not available in the local notebook application. Thus, once the prototype ML model is created, it is typically passed on to a production software team that must rewrite the code to generate a ML recipe suitable for use on an enterprise platform ("enterprise ML recipe"). The enterprise ML recipe provides the mechanism to reuse the model code across different use cases.

The process of rewriting a model from prototype code into an enterprise ML recipe is repetitive, cumbersome, and time consuming. Therefore, there is a need in the art for systems and methods that enable a seamless transition from developing prototype ML models in a notebook to distributing an enterprise ML recipe.

SUMMARY

Systems and methods for developing enterprise machine learning (ML) models within a notebook application are described. The system may include a notebook application, a packaging service, and an online ML platform. A runtime environment within the notebook application may perform tasks for developing an ML model, and for packaging a prototype ML model into an enterprise ML recipe. The method may include initiating the runtime environment within the notebook application, creating a plurality of files based on a notebook recipe template, generating a prototype model within the data science notebook application by accessing the plurality of files through the runtime environment, generating a production recipe including the runtime environment and the plurality of files, and publishing the production recipe to the online ML platform.

DETAILED DESCRIPTION

Figure 1:
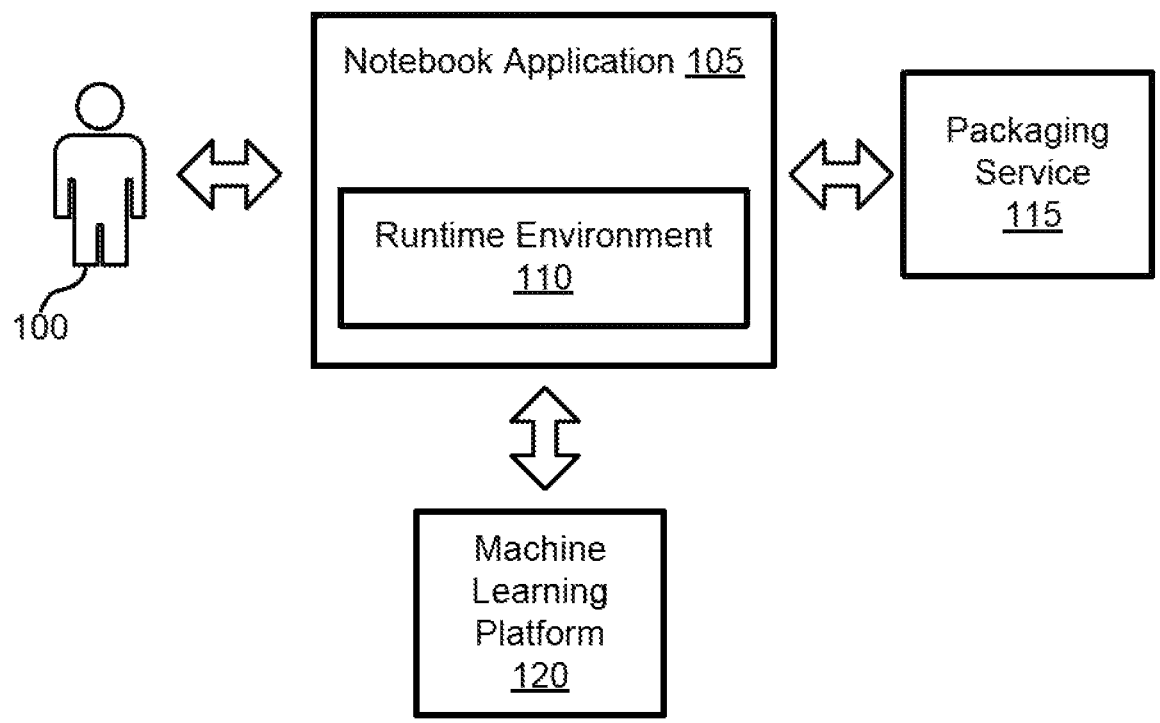
FIG. 1 shows an example of enterprise machine learning (ML) system in accordance with aspects of the present disclosure.

The present disclosure relates to a notebook interface for authoring an enterprise machine learning (ML) recipe. Data scientists write ML models from scratch in a highly iterative process. For example, they write the code that forms the basis of the ML model, and then re-write the model multiple times to test different configurations, algorithms, and model parameters. Data scientists often generate prototype ML models in a notebook application that allows them to locally document, visualize, and iterate the ML models (e.g., using the Jupyter™ Notebook). To allow reuse by data scientists and others, a prototype ML model developed within a notebook application can repackaged as an enterprise ML recipe and deployed on a large-scale enterprise platform, such as Adobe Experience Cloud®.

Conventionally, the step of converting a prototype ML model (i.e., a model developed on a local notebook) to an enterprise ML recipe involves a substantial effort. The code must be re-written, packaged, tested and deployed in a manner suitable for enterprise use. Data scientists and enterprise software teams spend an enormous amount of time (months or even years), and write a vast amount of plumbing code and packaging constructs to handle the complexity and differences between the prototype model and the enterprise recipe (i.e., configurations, dataset sizes, and parameters).

The overall process of creating an enterprise ML model may include five basic phases: 1) Data Acquisition, 2) Feature engineering, 3) Model Engineering, 4) Experimentation, and 5) Operationalization. Feature engineering, model engineering and experimentation often happen within the context of the notebook application, which provides a convenient interface for iteration. Operationalization prepares the ML model for enterprise use, which often requires rewriting the model code by an enterprise software team.

Feature engineering is the process of converting raw data from the Data Acquisition step into a usable form for analysis (i.e., identifying the model features). Model engineering is the process of creating a ML learning model itself. Typically, the model is created by selecting and importing a library to form the basis of a ML engine, and creating a specific ML model instance based on that engine. Model engineering typically involves selecting hyperparameters that fine tune the model for a particular application.

Experimentation is the iterative process of training a ML model using a set of hyperparameters, evaluating the model using a reserved portion of the training data, and then revising the hyperparameters (and, in some cases, the basic ML engine) based on the results of the evaluation.

Once a ML model is optimized via experimentation, it may be used to make predictions or categorizations based on new data in a process known as scoring. The results of the scoring may also lead to additional iteration and experimentation. When the prototype ML model is complete, it may be used to make predictions about new data, as well as to generate insights about the data. Some or all these processes may be performed within a notebook application.

While the notebook environment is designed for writing code that is easily iterated and revised, it is not suitable for writing production software. For example, the code may be written in a way that is specific to an application, and within a particular computing environment. The code would have to be substantially rewritten before a subsequent user may apply the model to different data in a different environment. Thus, after the prototype is finalized, it is often completely reworked by an enterprise software team in order to make it suitable for wider distribution and use. For example, the code must be parameterized, tested, packaged, and deployed in a manner suitable for an enterprise application.

Therefore, the present disclosure describes systems and methods that virtually eliminate the burdensome process of rewriting and packaging a prototype ML model generated within a notebook application into an enterprise ML recipe. Embodiments of the present disclosure enable the creation and publication of a ML recipe from a local notebook onto re-usable models available on an online ML platform, which enables enterprise users to have access to fast training and scoring of a variety of ML models across multiple clusters.

In some cases the described systems and methods may be used to implement a notebook model on a large-scale enterprise platform, such as the Adobe Experience Cloud®, in an organized structure. This in turn may enable the data scientist to package ML models to run multiple experiments and derive insights from large datasets, while continuing to make changes locally in a familiar workspace.

Embodiments of the present disclosure include a notebook interface with an embedded runtime environment that automatically performs interfacing tasks to make the preparation of enterprise software from within the notebook application seamless. Embodiments of the disclosure also include integration of the runtime environment with a packaging service (i.e., containerization service) and an online ML platform that supports authoring of enterprise models at scale.

Once initiated, the runtime environment creates a file structure suitable for an enterprise ML recipe, and provides user interface elements that facilitate interaction between the notebook application and the created files. For example, the runtime environment may provide and interact with files for loading data, configuring a ML model, training the model, evaluating the model, and scoring the model. Not only does this make creation of the prototype ML model easier (i.e., the local model built within the notebook application), once the work of creating the prototype is complete the runtime environment can automatically create an enterprise software package ready for distribution. The enterprise ML recipe can then be applied to contexts involving different parameters and training data.

In some examples, once the model is finalized within the notebook application, the runtime environment interacts with a packaging service to identify the library files utilized by the model (e.g., based on the kernel of the runtime environment and a requirements file created by the runtime environment), and package them together with the runtime environment itself and the model-specific files (i.e., files specifying the model pipeline and configuration parameters).

This enterprise ready package (which may also be referred to as the ML recipe) may then be published to an online, ML platform, where users may easily train the model with new training data and model parameters. Thus, multiple production ML models may be created from an enterprise ready package created from within the notebook application (i.e., for use in different client environments).

In other words, the ML recipe provides the mechanism to reuse a model in different contexts after it is created by a data scientist. In some cases, the ML recipe is imported into a notebook application by another user, and it contains all the code necessary to be used directly, outside the context of the notebook (i.e., it is containerized). Thus, an online ML platform may distribute a variety of these containerized ML recipes to users who may then run them from the cloud based enterprise ML platform. When the ML recipe package is run, it functions to load training data, set model parameters, train a new ML model, evaluate the trained model, and use the trained and evaluated model to score new data.

Thus, the present disclosure provides for embedding a runtime environment within a notebook application, where the runtime environment is configured to automatically create and package the files necessary to operate the model in a different computing environment. The conventional approach to authoring a ML model from within a notebook application often requires the code to be subsequently rewritten and packaged for enterprise use.

According to embodiments of the present disclosure, a ML model created within the notebook application is automatically packaged, deployed, and reused at scale without code rewrite. The systems and methods described herein drastically reduce the resources, time, and cost required to produce an enterprise level ML model by automatically providing a production software package based on the iterative processes performed while creating the prototype model.

The systems and methods of the present disclosure enable model experimentation from within the notebook application, enable local testing with increased efficiency in error handling and data analytics, allow ML models to be easily published to a version control system, and enable integration of different ML stages and pipelines.

FIG. 1 shows an example embodiment of the enterprise machine learning (ML) system in accordance with aspects of the present disclosure. The block diagram illustrated in FIG. 1 includes a user 100, a notebook application 105, a packaging service 115, and a machine learning (ML) platform 120. The user 100 creates a ML model within notebook application 105, package the code associated with the model into a ML recipe using the packaging service 115, and then publishes the ML recipe to the ML platform 120.

In some cases, a user 100 prompts the notebook application 105 to initiate a runtime environment 110 from within the data science notebook application 105. In other cases, the runtime environment may be initiated automatically. The notebook application 105 identifies a kernel associated with a programming language for the data science notebook application 105. The selected kernel then determines which runtime environment 110 is initiated. The runtime environment 110 creates a set of configuration and ML model files, and then operates in the background to interact with the files in a seamless way to facilitate creation of the ML recipe.

In an example embodiment, a user 100 creates a ML recipe from within a notebook application 105 by loading training data, selecting model parameters, and training a ML model. The ML model is then evaluated. After the evaluation, parameters of the model may be modified, and the process is repeated until the model performs as desired. In some cases, additional data is scored using the model (i.e., the model is used to make predictions). Then a containerized package including all the code necessary to recreate the model on another system is packaged into a ML recipe that is published to an enterprise ML platform 120. Within the enterprise ML platform 120, other users may create additional instances of the ML model using different training data and parameters.

ML Model: The systems and methods described herein are used to create a ML model that can be used to make predictions based on data. The historical data (or synthetic data) used to train a model includes both input attributes (i.e., features) and a target attribute (i.e., the "correct answer"). A trained model represents patterns in the training data associated with the target attribute, and uses that information to anticipate target attributes for new sets of yet analyzed data.

In some cases, a ML model as described herein takes the form of an artificial neural network (ANN). An ANN includes a number of connected nodes (a.k.a., artificial neurons), which may be seen as loosely corresponding to the neurons in a human brain. Each connection, or edge, transmits a signal from one node to another (like the physical synapses in a brain). When a node receives a signal it can process the signal and then transmit the processed signal to other connected nodes. In some cases, the signals between nodes comprise real numbers, and the output of each node is computed as a function of the sum of its inputs. Each node and edge may be associated with one or more weights that determine how the signal is processed and transmitted.

During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold for transmitting a signal, below which a signal is not transmitted. The nodes may also be aggregated into layers. Different layers perform different transformations on their inputs. The initial layer may be known as the input layer and the last layer may be known as the output layer. In some cases, signals traverse certain layers multiple times. In some cases, the number and configuration of layers are configurable hyperparameters of a ML recipe.

In some cases, the term "parameters" refers specifically to the node weights, coefficients, or other values that are set during the training process. The term "hyperparameters" is used to specify those parameters that are not adjusted during the training process (e.g., the number of layers, types of layers, a learning rate, C and sigma values (for SVM) and kin k-nearest neighbor models, etc.). In the present disclosure the term "parameters" may be used to refer to both trained parameters and hyperparameters.

ML Recipe: A ML recipe is a template for creating ML models suitable for reuse across different contexts and use cases. The first step in creating a ML recipe involves a user 100 selecting one or more core algorithms (i.e., for regression, clustering, classification, etc.). In some cases, the recipe template is based on a proprietary algorithm or an ensemble of algorithms addressed to solving specific business solutions. In some embodiments, prebuilt recipes addressed to specific business problems are available to a user from within the notebook application. In other cases, a user 100 alters available archived recipes, or creates their own.

A user 100 generates one or more ML instances from the recipe to create a trained prototype model. A ML instance refers to a specific implementation of the recipe template in which the core algorithm is paired with tuning parameters. An occurrence of the recipe is also configured with a data definition addressed to specific business problems. One recipe template may be associated with multiple ML instances. Each ML instance has different parameters and hyperparameters. The ML instances are trained and experimented upon within the notebook application 105 to produce a model suitable for making predictions and extracting insights from the data.

Notebook Application: According to embodiments of the present disclosure, the notebook application 105 is used for creation of ML recipes, incorporation of a ML recipe into a reusable model, publication of the ML recipe, automated deployment of models for training at scale, and fast training and scoring of models across multiple clusters. In other words, notebook application 105 provides a virtual space in which a user can perform data analysis as implemented for various purposes (e.g., data science).

In example embodiments, the notebook application 105 provides a literate programming environment that combines word processing software with both the shell and kernel of the notebook. Literate programming refers to a method of programming in which program logic is written in a natural language that is interspersed with code snippets and macros. For instance, literate programming involves a paradigm that relates arbitrary descriptive phrases written in a natural language with operator macros, and incorporates the descriptive phrases into source code and resultant output facilitating facile interpretation and editing. Thus, the computer science intensive features of the notebook application 105 are more accessible to users 100 regardless of prior programming expertise.

Runtime Environment: Runtime environment 110 includes a library of classes and files that include functions for enabling the seamless production of an enterprise ML recipe from within the notebook application 105. The runtime environment 110 is packaged together with the user code to form a single execution entity using docker or another suitable containerization system.

In some embodiments, the runtime environment 110 includes libraries associated with multiple kernels (based on the programming languages that may be selected by the user 100). For example, runtime environment 110 may include code kernels associated with Python®, Spark™, and other common programming languages. The runtime libraries contain a list of driver classes that perform basic machine learning functions like training, scoring, evaluation, and feature pipelines. During execution, these drivers function based on implementation variables provided by the data scientist.

The runtime environment 110 implements the core library of code used to achieve model re-usability by utilizing complex logic for configuration management, model saving/retrieving and generation of out-of-box model insights. In other words, the runtime environment 110 creates and interacts with the files used to produce an enterprise ready ML recipe from within the notebook application 105. Runtime environment 110 enables the user 100 to generate a single ML model using an iterative process, and then create a ML recipe (e.g., using packaging service 115) that can be reused to create other ML model instances. Thus, the runtime environment 110 provides an environment where the user (i.e., the data scientist) need not understand the complexities of building and containerizing code when using the notebook to enterprise recipe workflow.

Runtime environment 110 enables the distribution of the model logic in a reproducible way that allows for configuration and tuning. That is, it serves as an out-of-box model tuner to auto-tune the hyper parameters of the model. The runtime environment 110 also ensures that the ML is decoupled from the notebook application 105 and the machine running it. Runtime environment 110 may also enable auditing with model evaluation based on common pieces of code.

Packaging Service: The ML system permits a user 100 to package ML models using a packaging service 115. For example, the packaging service 115 identifies all the code used to recreate the ML model on another system, and combine it into a single package. Examples of code in the ML recipe package include the runtime environment, library files used to create the ML model, and the model specific files created by user 100 (i.e., files specifying the model pipeline, model parameters, and instructions for loading and manipulating training data, and files for evaluating a model based on a portion of the training data reserved for evaluation).

In some embodiments, packaging service 115 is used to create a containerized version of the ML recipe. A container refers to space allocated for a specific purpose within a computer's virtual memory. For example, containerized programs may run directly on a host operating system's kernel within the user space, but may have restricted resource access and finite hardware resources. A containerized package is a software package designed to be run from within a container (i.e., independent of any other software other than the operating system). Thus, the ML recipe created by packaging service 115 is capable of running in a container of a host's virtual memory that can only interact with the file system and device it has been assigned. An operating system may possess several containers for separate programs, or an individual container may contain multiple computer programs.

Thus, the containerized ML recipe created by packaging service 115 enables the user 100 or other users to create multiple ML models and run multiple experiments that extrapolate insights from large datasets that would otherwise be intractable to perform by traditional means.

Online ML platform: After the packaging service 115 prepares a ML recipe (i.e., a containerized package including all the code sufficient to create a new ML model based on the prototype model), the ML recipe may be published to a ML platform 120 for distribution and creation of enterprise machine learning models. It should be noted that the process of training and evaluating models can happen both locally (i.e., within the notebook application 105) and on a cloud based enterprise platform (i.e., within the ML platform 120).

Once the ML recipe is published, the user 100 or another user may select the recipe, select data to train a new ML model, and set parameters for the model (i.e., based on a configuration file created by the runtime environment 110 within the notebook application 105). Using the new training data and parameters, an enterprise Ml model will be created according to the recipe. This model is used to make predictions for a scientific or business application. In some examples, the ML platform 120 includes specialized user interfaces for selecting the ML recipe, selecting the new training data, selecting the model parameters, training the ML model, and deploying the ML model, e.g., for creating an application programming interface (API) for using the enterprise model.

Thus, according to example embodiments of the present disclosure, user 100 can experiment from within a notebook application 105, evaluate results, seamlessly orchestrate an enterprise model in a common workspace that integrates various ML pipelines (e.g., preprocessing in Spark™, training in Python®/Tensorflow®), publish to a version-control system for tracking changes in source code (e.g., using Git™, Mercurial™, or Subversion®), and utilize the runtime environment 110 for enterprise model management. In some examples, these processes can all be performed on the ML platform 120, such as customer experience platform (e.g., Adobe Experience Cloud®), to permit access to fast training and scoring of models across multiple clusters.

Hardware: In some embodiments, the notebook application 105, as well as the runtime environment 110, are implemented as applications that operate on a computing system that includes components such as a processor and memory. Memory may include RAM, ROM, or a hard disk. The memory may be solid state or a hard disk drive, and may include store computer-readable, computer-executable software including instructions that, when executed, cause a processor to perform various functions described herein.

A processor of the system operating the notebook application 105 may be provided to implement computer readable instructions stored in memory to perform various processes. A processor may include an intelligent hardware device, (e.g., a general-purpose processing component, a digital signal processor (DSP), a central processing unit (CPU), a graphics processing unit (GPU), a microcontroller, application specific integrated circuit (ASIC), a field programmable gate array (FPGA), programmable logic device, a discrete gate or transistor logic component, a discrete hardware component, or any combination thereof).

Thus, a notebook interface according to embodiments of the present disclosure performs functions that include: acquisition of an identity management system (IMS) user name and notebook path to access notebook blob storage location; creation of a temporary workspace to store the model artifact generation of the model artifact from the notebook; model production from the engine artifact via the ML Framework; processing of POST calls and responses to an online ML framework; providing model metadata (i.e., for training and scoring of artifacts and for providing model specification API headers): JavaScript Object Notation (JSON) parsing responses from ML framework to obtain model ID, and to store the model; and returning the model ID to open the model specification page in a new notebook browser tab.

In some embodiments, creation of the model artifact includes model generation specific to the kernel used (e.g., a kernel associated with Python®, PySpark™, R, etc.), creation of files based on the pre-specified software development kit (SDK) interface for authoring ML models using the runtime environment, and storing of the model artifact (e.g., as a.jar or Egg file). Model metadata may include the model name, description, type, and image uniform resource locators (URLs), training and scoring artifacts derived from the model artifact, and engine API headers to include an IMS token, Client ID, and IMS Org ID.

Figure 2:
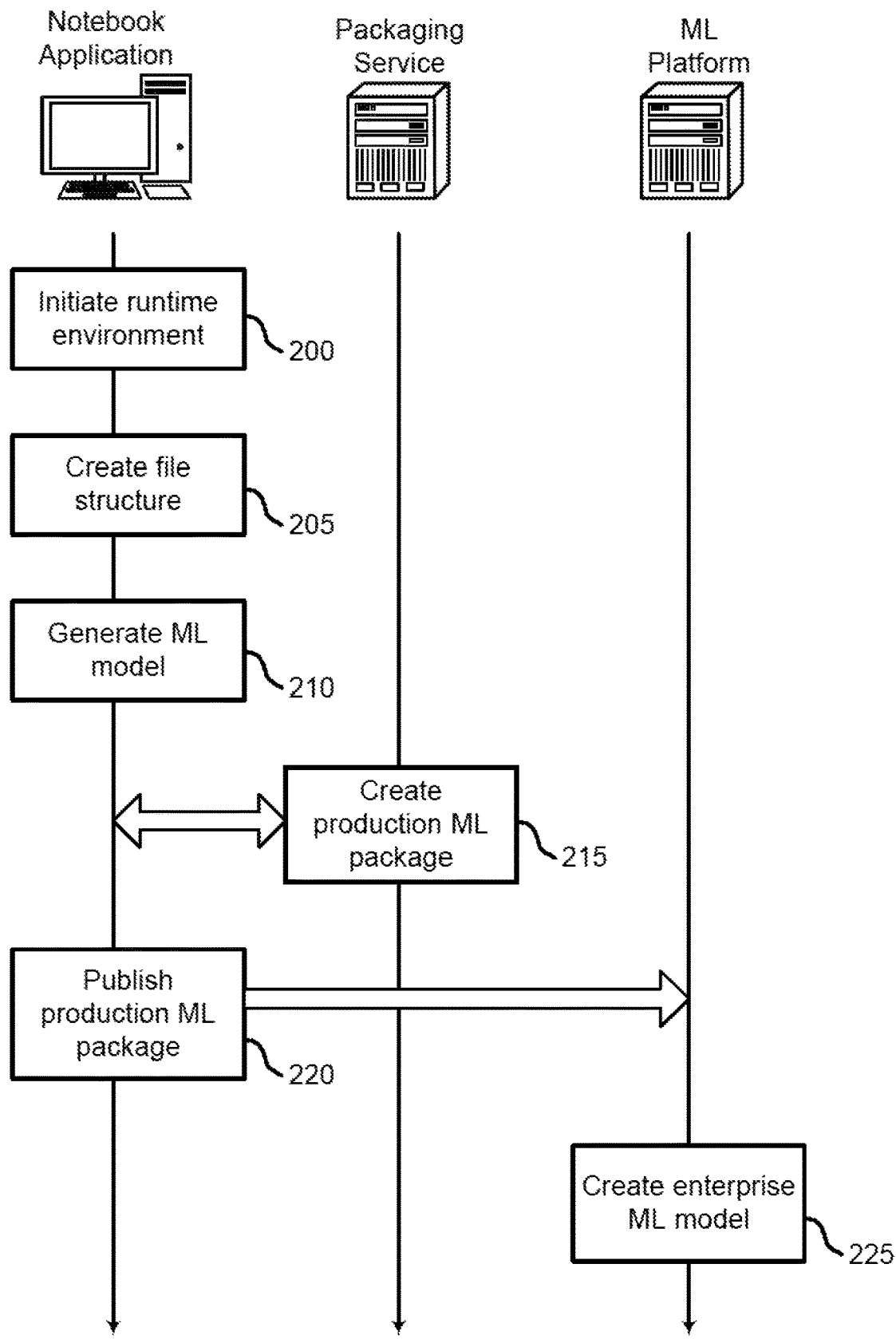
FIG. 2 shows an example of a process for developing and deploying an enterprise machine learning model within a notebook application in accordance with aspects of the present disclosure.

FIG. 2 shows an example of a process for developing and deploying an enterprise ML model from within a notebook application in accordance with aspects of the present disclosure. In some examples, these operations are performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 200, the system initiates a runtime environment within a notebook application. In some cases, the operations of this step may refer to, or be performed by, a notebook application 105 as described with reference to FIG. 1. For example, user 100 may initiate the runtime environment 110 from within the notebook application 105.

In some cases, the notebook application may be located on a cloud-based platform (e.g., within the ML platform 120). That is, the workflow for authoring enterprise ML models via the notebook application 105 may include acquiring an identity management system (IMS) user name and notebook path to access a notebook storage location. An IMS may offer authentication and authorization for users along with management of permissions and roles during provisioning. The IMS used by a user interface or API distinguish users and services for loading notebook environments and package recipes, as well as to build models in the ML platform by passing in a secure JSON Web Token (JWT). Thus, the system may create engine API headers including IMS tokens, a Client ID, and an IMS Org ID to facilitate the creation and distribution of an enterprise ML model.

In some cases, the user 100 begins by selecting the runtime environment 110 and the notebook recipe template according to a selected kernel (e.g., based on a programming language or code library). Model generation may be specific to the kernel used (e.g., a kernel associated with Pyspark™, R™ for Jupyter® notebook, etc.). The project files created by the runtime environment 110 may be based on a pre-specified software development kit (SDK) interface associated with the kernel.

At step 205, a file structure is created. In some cases, the operations of this step may refer to, or be performed by, a runtime environment 110 as described with reference to FIG. 1. For example, the runtime environment 110 included in the notebook application 105 may create a file structure including a plurality of files based on a notebook recipe template (i.e., configuration files, requirements files, and files associated with different stages of model development) and generate a prototype model by accessing and modifying the plurality of files.

In some examples, a temporary workspace is created to store a model artifact within the notebook application 105. For example, a "generate notebook-recipe template" option may be available from the notebook application 105 (i.e., the Jupyter® Lab launcher). This feature creates a project structure with separate source files for each component in the pipeline (i.e., training, scoring, preprocessing), along with a resources section containing a config.json file. The system may perform a JavaScript® Objection Notation (JSON) parse operations to obtain a model ID. The model ID is then returned, and a model specification page is opened in a new notebook browser tab.

The plurality of files may comprise a data loading file, a configuration file, and a model file. In some examples, files are created for each stage of a process for creating an enterprise ML recipe, including loading data, configuring a ML evaluating the ML model, and scoring new data.

Other files may include files indicating which libraries are to be used for creating the packaged ML recipe (e.g., the sci-kit library for Python®) and files for developing insights based on the ML model. One or more of the files may specify model metadata. Model metadata may include the model name, description, type, and image URL. Training and scoring artifacts are derived from the model artifact.

At step 210, the system generates a ML model. In some cases, the operations of this step may refer to, or be performed by, a runtime environment as described with reference to FIG. 1. For example, the runtime environment 110 may load data based on the data loading file and/or a configuration from the configuration file and train the prototype model within the data science notebook application 105 based on the data, the configuration, and/or the model file. Runtime environment 110 may also evaluate the prototype model from within the data science notebook application 105 using a sample portion of the data.

According to embodiments of the present disclosure, a user 100 designs a recipe from the notebook application 105, and alterations to the recipe or ML instances are automatically associated with one or more of the project files by the runtime environment 110. The runtime environment 110 may also score additional data within the data science notebook application 105 using the prototype model. The runtime environment 110 may modify one or more of the plurality of files based on the evaluation, such that a production recipe is generated based upon the modification.

At step 215, the system creates a production ML package (i.e., the ML recipe). In some cases, the operations of this step may refer to, or be performed by, a packaging service 115 as described with reference to FIG. 1. For example, the runtime environment 110 may identify one or more library files based on a requirements file from the plurality of files, wherein the production recipe is generated based upon the one or more library files. The packaging service 115 may then generate the production recipe including the runtime environment 110 and the plurality of files.

At step 220, the system publishes the production ML package to an enterprise platform, which may be based in the cloud. In some cases, the operations of this step may refer to, or be performed by, a notebook application 105 as described with reference to FIG. 1. A user 100 may determine whether the tested model should be available locally or for distribution. For example, the notebook application 105 may publish the ML recipe to the ML platform 120. Publishing the ML recipe enables immediate use from within ML platform 120. Notebook application 105 may also publish the plurality of files to a version control service.

At step 225, the system creates an enterprise ML model based on the production ML package. In some cases, the operations of this step may refer to, or be performed by, a ML platform as described with reference to FIG. 1. In some embodiments, a user of the cloud-based ML platform 120 may evaluate the production model using a portion of the training data. The ML platform 120 may select additional data and score the additional data within the cloud-based. ML platform 120 using the production model. Training, scoring, and testing can be performed within the ML platform 120 to compare and retrieve insights reflective of variously input ML instances and/or engines. A final model may be created, which accepts an input dataset and returns a scored dataset.

Thus, the ML model is produced from the engine artifact (i.e., the ML recipe) by machine learning platform 120. In some cases, the model is created by making a POST call to a cloud based ML service (e.g., Adobe Sensei® ML platform) providing model metadata, training and scoring artifacts, and model specification API headers. The ML platform 120 may also create methods for enterprise utilization of the ML models (e.g., and API for utilizing the model).

ML platform 120 also selects the production recipe from a plurality of published recipes available to the cloud-based ML platform 120 and selects the training data. The ML platform 120 also selects one or more parameters based on a configuration file of the production recipe. ML platform 120 may also generate one or more data insights within the cloud-based ML platform 120 based at least in part on the scoring. According to an exemplary embodiment, the ML platform 120 may also train a production model within the cloud-based ML platform 120 based on the production recipe, the training data, and/or the one or more parameters.

In some examples, the ML platform 120 tracks evaluation metrics for each unique recipe instance and each trained instance to help a user determine the learning instance(s) that performs best in a given context. When the best trained model for a business need is determined, a user can create an intelligent service without necessitating additional developer assistance or coding (e.g., by using Adobe® Data Science Workspace). The intelligence service may be published (e.g., to Adobe® I/O) to obtain additional insights. Once the intelligent service is deployed, where and how it is used may be recorded. This permits retraining as necessary to refine performance as more data becomes available.

Figure 3:
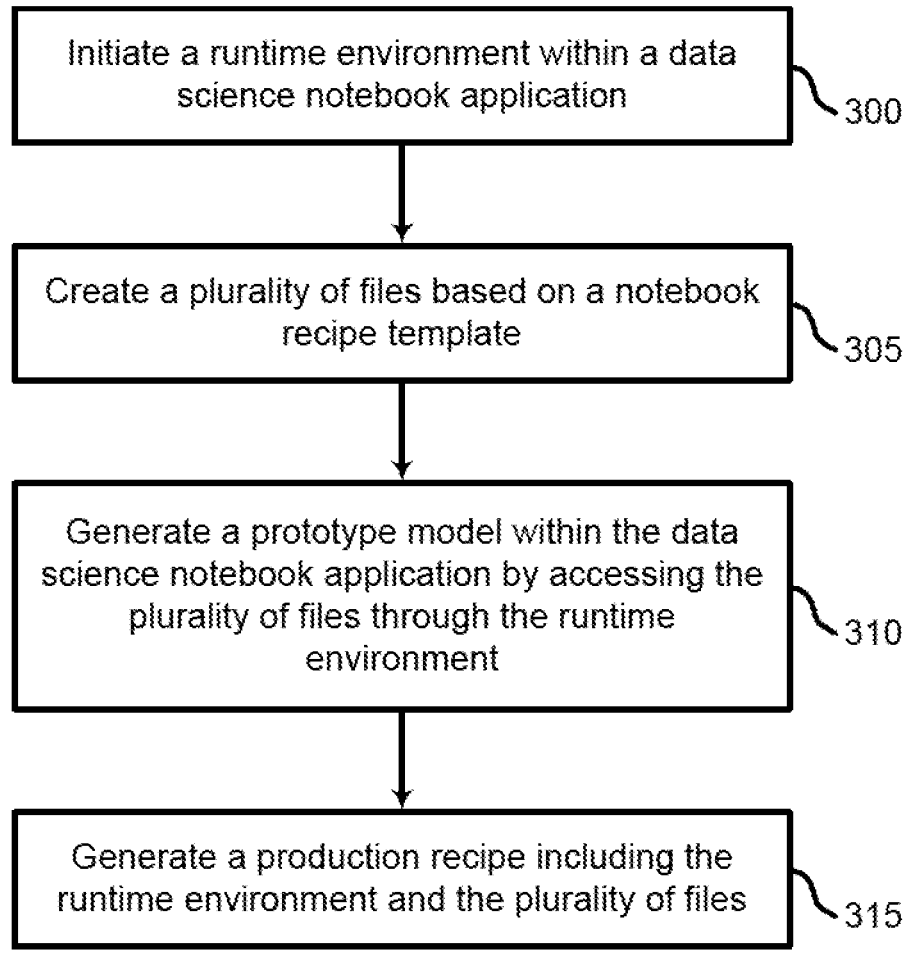
FIG. 3 shows a flowchart according to an example of a process for developing enterprise machine learning models within a notebook application in accordance with aspects of the present disclosure.

FIG. 3 shows an example of a process for developing enterprise ML models within a notebook application in accordance with aspects of the present disclosure. In some examples, these operations are performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 300, the system initiates a runtime environment within a data science notebook application. In some cases, the operations of this step may refer to, or be performed by, a notebook application as described with reference to FIG. 1. For example, the user 100 may begin by selecting a kernel associated with a programming language for the runtime environment 110. Model generation may be specific to the selected kernel. In some cases, the project files created by the runtime environment 110 may be also based on a pre-specified SDK interface associated with the kernel.

At step 305, the system creates a plurality of files based on a notebook recipe template. In some cases, the operations of this step may refer to, or be performed by, a runtime environment as described with reference to FIG. 1. Further detail regarding steps 300 and 305 may be found in the description of the process with reference to FIG. 4. The created files may depend on the kernel selected for the runtime environment. For example, if Python® is selected as the kernel, Python® code files may be created, and the requirements file may specify the use of Python® ML libraries (e.g., scikit-learn).

The file structure may include multiple nested folders and files associated with various stages of the model development process, as well as configuration and requirements files (i.e., a file indicating what libraries are used for performing the ML functions associated with creating and operating the model). The plurality of files may include files for loading data, exploring data, storing parameters, training a ML model based on the stored parameters, evaluating a ML model, scoring new data, as well as files for storing the actual ML instance (i.e., the nodes and edges, and the associated weights).

At step 310, the system generates a prototype model within the data science notebook application by accessing the plurality of files through the runtime environment. In some cases, the operations of this step may refer to, or be performed by, a runtime environment as described with reference to FIG. 1.

For example, the notebook interface (using the runtime environment) may be used to explore data, develop features that describe the data, select a model and model parameters, train a ML model, evaluate the ML, and make predictions about new data. The runtime environment may load training data based on the data loading file and may select a configuration based on the configuration file. The runtime environment may then train the prototype model based on the data, the configuration, and/or the model file. The training process may include automatically adjusting weights of the ML model to improve the accuracy of model predictions. In some cases, the number and configuration of layers may become configurable parameters of a ML recipe.

The runtime environment may also evaluate the prototype model from within the data science notebook application using a sample portion of the data. For example, the model may be used to make predictions based on input data that was not used for training, but for which the "correct answer" is already known. Further detail regarding step 310 may be found in the description of the process with reference to FIG. 5.

In some cases, a user may design a ML recipe, and alterations to the recipe may be automatically associated with one or more of the project files by the runtime environment. The runtime environment may also score additional data within the data science notebook application 105 using the prototype model. The runtime environment 110 may modify one or more of the plurality of files based on the evaluation, such that a production recipe is generated based on the modification.

At step 315, the system generates a production recipe including the runtime environment and the plurality of files. In some cases, the operations of this step may refer to, or be performed by, a packaging service as described with reference to FIG. 1. For example, the runtime environment may identify the library files used to train, evaluate and run the ML model based on a requirements file. A packaging service may then generate the production recipe by containerizing the runtime environment, the library files, and the plurality of files created by the runtime environment.

The production ML package (i.e., the ML recipe) may then be published to a cloud based enterprise platform. Publishing the ML recipe enables immediate use from within ML platform by a large number of users for different applications. The ML recipe (or a subset of the files, such as the files created by the runtime environment) may also be published to a version control service. Further detail regarding step 315 may be found in the description of the process with reference to FIG. 6.

Figure 4:
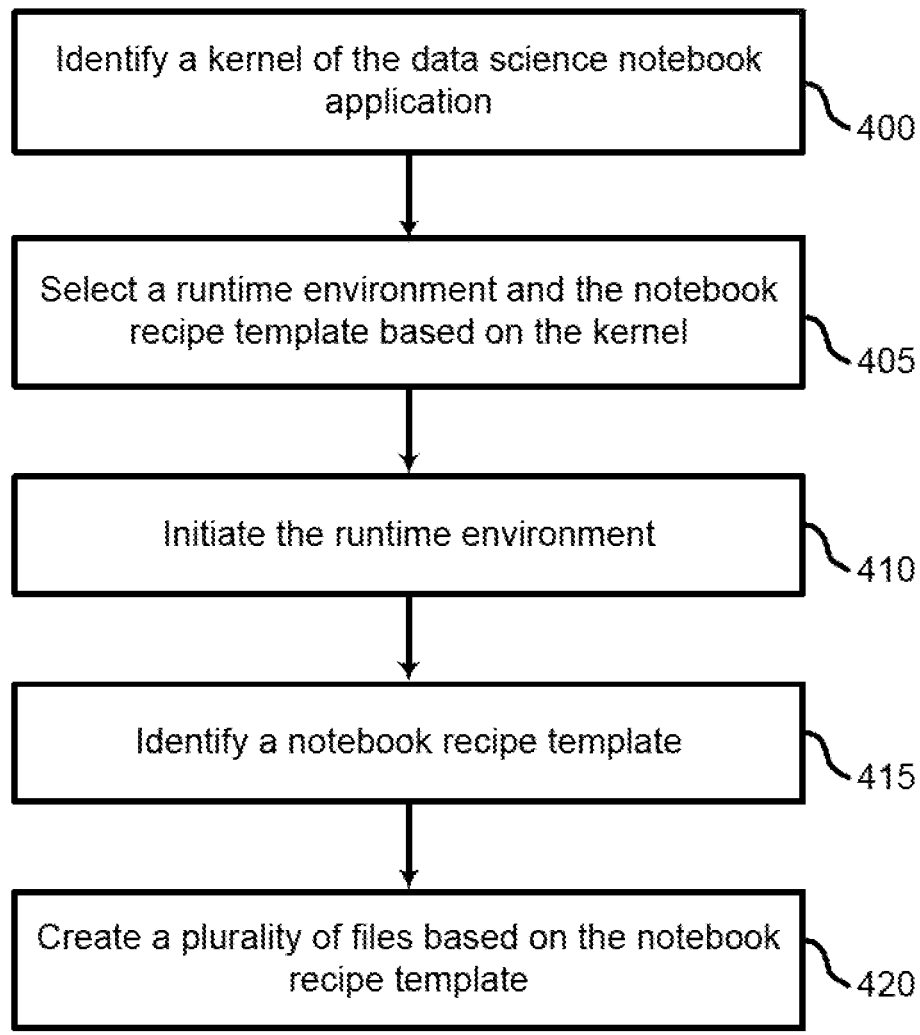
FIG. 4 shows a flowchart according to an example of initiating a runtime environment within a data science notebook application in accordance with aspects of the present disclosure.

FIG. 4 shows an example of initiating a runtime environment within a data science notebook application in accordance with aspects of the present disclosure. In some examples, these operations are performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 400, the system identifies a kernel of the data science notebook application. In some cases, the operations of this step may refer to, or be performed by, a notebook application as described with reference to FIG. 1. For example, the notebook application may be designed to support programming in a variety of different languages. The kernel may be selected by the user, and may correspond to a programming language used by the user within the notebook application. Examples of different programming languages that may be selected include Python®, Spark™, PySpark™, R™, and any other programming language suitable for developing a ML model.

At step 405, the system selects a runtime environment and the notebook recipe template based on the kernel. In some cases, the operations of this step may refer to, or be performed by, a notebook application as described with reference to FIG. 1. Just as the notebook application may include different libraries associated with different programming languages, the specific code used for the runtime environment may include a plurality of different versions associated with the different programming languages. That is, depending on the preferred programming language of the user (i.e., the one selected and identified in step 400), the runtime environment utilizes different code libraries, and corresponds to a different executable file.

At step 410, the system initiates the runtime environment. In some cases, the operations of this step may refer to, or be performed by, a notebook application as described with reference to FIG. 1. For example, the notebook application interface may initiate an executable file for the runtime environment based on the selected kernel. In some examples, the executable file or files associated with the runtime environment file may be written in the same language as that selected by the user, such as the language associated with the kernel. However, in other examples the runtime environment itself is written in another language capable of interacting with the selected programming language.

At step 415, the system identifies a notebook recipe template. In some cases, the operations of this step may refer to, or be performed by, a runtime environment as described with reference to FIG. 1. As with the executable runtime environment, the notebook recipe template may depend on the selected kernel. In one embodiment, the notebook recipe template may include a model of a file structure for creating an enterprise ML recipe. For example, the model of the file structure may include multiple nested folders and files associated with various stages of the model development process, as well as configuration and requirements files. The notebook recipe template may specify files for loading data, exploring data, storing parameters, training a ML model based on the stored parameters, evaluating a ML model, scoring new data, as well as files for storing the actual ML instance (i.e., the nodes and edges, and the associated weights).

At step 420, the system creates a plurality of files based on the notebook recipe template. In some cases, the operations of this step may refer to, or be performed by, a runtime environment as described with reference to FIG. 1. The operations of step 420 may correspond to those of steps 205 and 305 described with reference to FIGS. 2 and 3.

Figure 5:
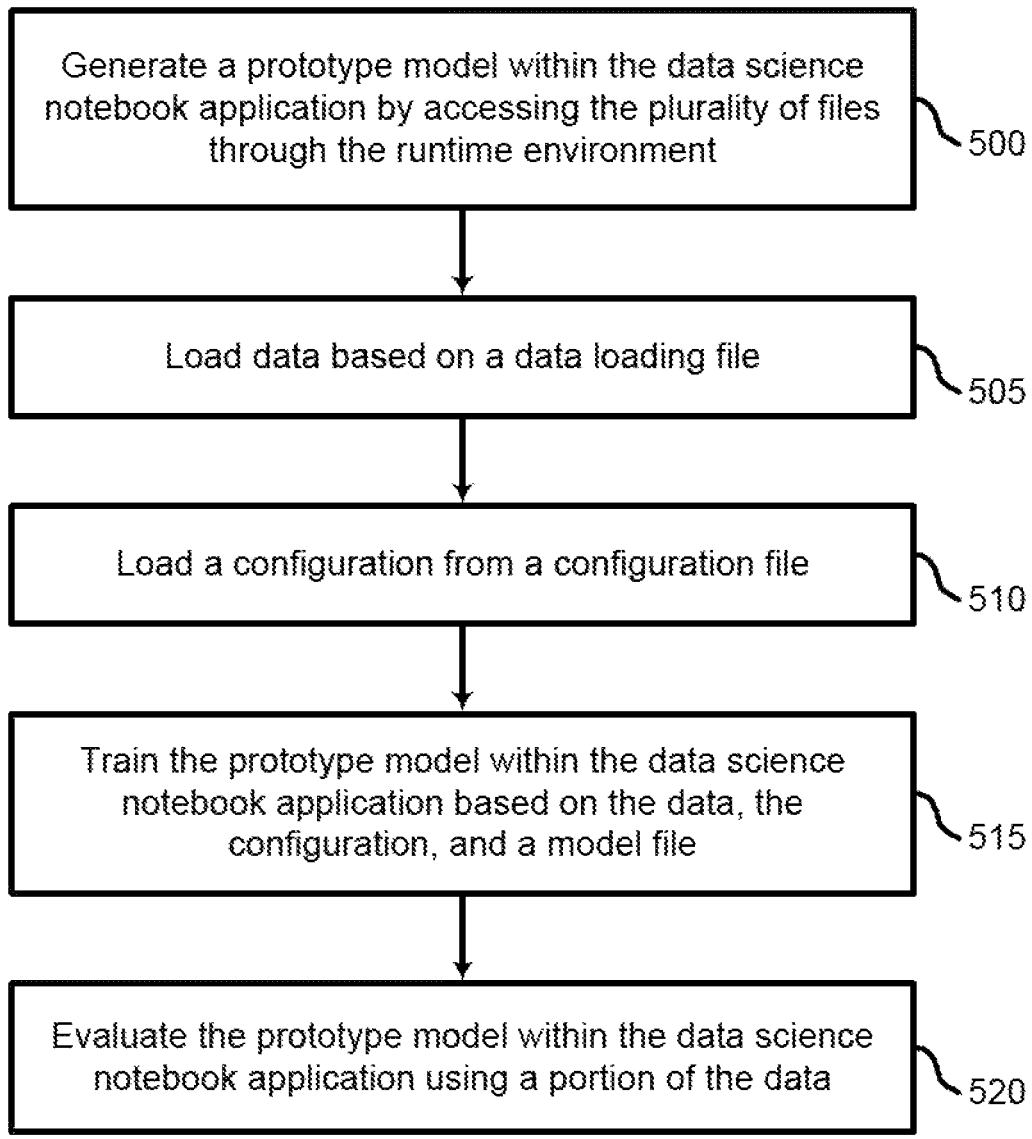
FIG. 5 shows a flowchart according to an example of generating a prototype model within a data science notebook application in accordance with aspects of the present disclosure.

FIG. 5 shows an example of generating a prototype model from within a data science notebook application in accordance with aspects of the present disclosure. In some examples, these operations are performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 500, the system generates a prototype model within the data science notebook application by accessing the plurality of files through the runtime environment. In some cases, the operations of this step may refer to, or be performed by, a runtime environment as described with reference to FIG. 1.

An instance of the NIL model may be created based on a ML library that specifies model type from a variety of model types. Some model types, such as ANNs, includes a number of nodes, edges, and associated weights. Others include different parameters such as function coefficients. Initially, the prototype model is an untrained model. That is, it includes the various layers, nodes and edges (or functions), but the weights and coefficients are set to default values. Thus, initially the model is not suitable for making predictions about data. However, it still depends on the model type and hyperparameters selected by the user.

At step 505, the system loads data based on a data loading file. In some cases, the operations of this step may refer to, or be performed by, a runtime environment as described with reference to FIG. 1. Typically, a portion of the initial data may be set apart for evaluation (i.e., not used for training the model).

Furthermore, prior to training a ML model, the data is often processed and converted into a form including an input vector that specifies particular features, and a target that specifies the desired output of the model. In some cases, identifying the correct features to use for training, the model is a significant part of the work of a data scientist. The notebook interface may include features that facilitate exploration of the data so that selection of the proper features for training (and scoring) the ML model may be accomplished more efficiently (i.e., feature engineering). For example, the notebook interface may utilize dimensionality reduction algorithms, feature extraction algorithms, data normalization algorithms, and other functions to prepare the loaded data for use in training or scoring.

At step 510, the system loads a configuration from a configuration file. In some cases, the operations of this step may refer to, or be performed by, a runtime environment as described with reference to FIG. 1. In some cases, configuration parameters may be loaded prior to generation of the model instance. For example, the configuration can include such things as the type of model being used. Example model types may include a support vector machine (SVM), nearest neighbor, random forest, ride regression, spectral clustering, k-means, or any other suitable model type or combination of model types. For example, different model types may be combined in different layers to produce a complex model type.

Other parameters may include hyperparameters such as the number of layers, a learning rate, C and sigma values (for SVM) and k in k-nearest neighbor models. Thus, the term parameters may be used to refer to a model type, hyperparameters associated with a model type, and the parameters of a trained model (i.e., the weights in an artificial neural network, the support vectors in a support vector machine, the coefficients in a linear regression or logistic regression, etc.).

At step 515, the system trains the prototype model from within the data science notebook application based on the data, the configuration, and a model file. In some cases, the operations of this step may refer to, or be performed by, a runtime environment as described with reference to FIG. 1.

As discussed above, the model may be trained based on a portion of the training data, which has been processed so that the relevant features of the data may be used for the input vector. In some cases, training the ML model may include adjusting the parameters of the model (i.e., the weights of an ANN), and then comparing the output of the model to the target vector using a loss function). Training may include a large number of cycles of adjustment and evaluation. In some cases, parameters for training may include parameters related to how the adjustments are made, parameters for the loss function, and how many training cycles to perform.

At step 520, the system evaluates the prototype model within the data science notebook application using a portion of the data. In some cases, the operations of this step may refer to, or be performed by, a runtime environment as described with reference to FIG. 1. Evaluation is similar to training in that the model is used to make a prediction based on training data, and the result is compared to a known target. However, training usually results in adjustment of model parameters (e.g., weights, coefficients, etc.), whereas evaluation may lead to the adjustment of hyperparameters (or additional feature engineering, or selection of a different model type, or retraining using different training data, etc.). For example, model evaluation can be used to determine whether a ML model has been over trained. That is, in some cases a ML model is trained to recognize very particular features of the specific data used for training, but is not accurate for different, but related data. Setting apart some of the initial training data can help determine Whether this has occurred.

Figure 6:
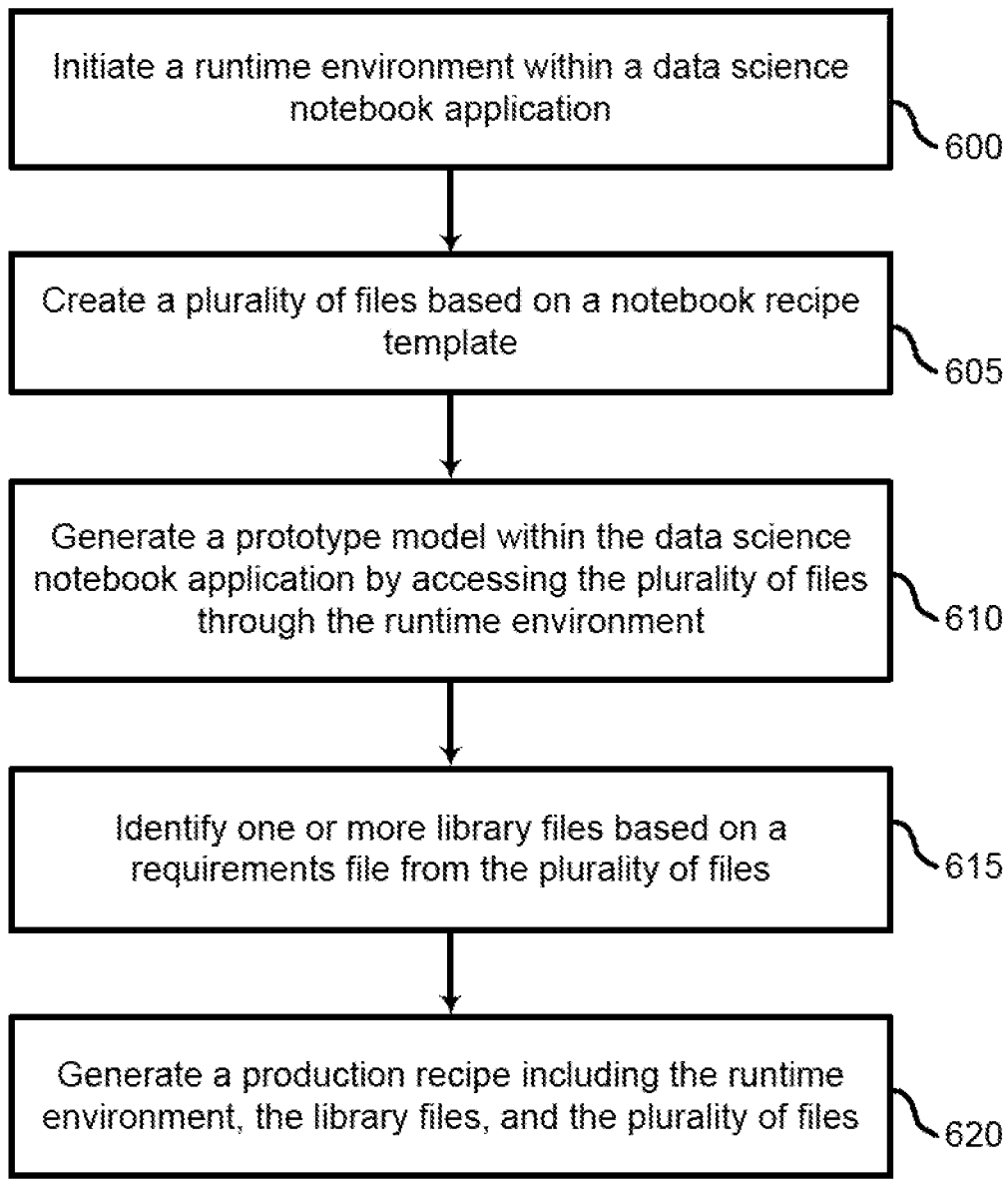
FIG. 6 shows a flowchart according to an example of generating a production recipe package in accordance with aspects of the present disclosure.

FIG. 6 shows an example of generating a production recipe package in accordance with aspects of the present disclosure. In some examples, these operations are performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various sub-steps, or may be performed in conjunction with other operations described herein.

At step 600, the system initiates a runtime environment within a data science notebook application. In some cases, the operations of this step may refer to, or be performed by, a notebook application as described with reference to FIG. 1. Step 600 may include aspects of steps 200, 300, 400, 405, and 410 described with reference to FIGS. 2-4. The runtime environment may be based on a kernel associated with a programming language selected by the user. In some cases, the notebook interface may automatically detect a programming language used by the user and initiate the runtime environment based on the detected programming language.

At step 605, the system creates a plurality of files based on a notebook recipe template. In some cases, the operations of this step may refer to, or be performed by, a runtime environment as described with reference to FIG. 1.

At step 610, the system generates a prototype model within the data science notebook application by accessing the plurality of files through the runtime environment. In some cases, the operations of this step may refer to, or be performed by, a runtime environment as described with reference to FIG. 1.

At step 615, the system identifies one or more library files based on a requirements file from the plurality of files. In some cases, the operations of this step may refer to, or be performed by, a runtime environment as described with reference to FIG. 1.

At step 620, the system generates a production recipe including the runtime environment, the library files, and the plurality of files. In some cases, the operations of this step may refer to, or be performed by, a packaging service described with reference to FIG. 1.

Thus, a method for developing enterprise machine learning (ML) models within a notebook application is described. The method includes initiating a runtime environment within a data science notebook application, creating a plurality of files based on a notebook recipe template, generating a prototype model within the data science notebook application by accessing the plurality of files through the runtime environment, and generating a production recipe including the runtime environment and the plurality of files.

An apparatus for developing enterprise ML models within a notebook application is also described. The apparatus may include a processor, memory in electronic communication with the processor, and instructions stored in the memory. The instructions may be operable to cause the processor to create a prototype ML model using a plurality of files created by a runtime environment within a data science notebook application based on first training data and first model parameters; and generate a production ML recipe including the runtime environment and the plurality of files; distribute the production ML recipe to a ML platform; and create an enterprise ML model within the ML platform using the production recipe based on second training data and second model parameters.

A non-transitory computer readable medium storing code for developing enterprise ML models within a notebook application is also described. In some examples, the code comprises instructions executable by a processor to: initiate a runtime environment within a data science notebook application; create a plurality of files based on a notebook recipe template, wherein the plurality of files comprises a data loading file, a configuration file, and a model file; load data based on the data loading file; load a configuration from the configuration file; train a prototype model within the data science notebook application based on the data, the configuration, and the model file; and evaluate the prototype model within the data science notebook application using a portion of the data.

Some examples of the method, system, and non-transitory computer readable medium described above may further include identifying a kernel of the data science notebook application. Some examples of the method, system, and non-transitory computer readable medium described above may further include selecting the runtime environment and the notebook recipe template based on the kernel. In some examples of the method, system, and non-transitory computer readable medium described above, the plurality of files comprise a data loading file, a configuration file, and a model file. In some cases, the runtime environment includes a set of library files including functions configured to perform steps for the production, experimentation, evaluation, and packaging of the prototype model.

Some examples of the method, system, and non-transitory computer readable medium described above may further include training the prototype model within the data science notebook application based on the data, the configuration, and the model file. Some examples of the method, system, and non-transitory computer readable medium described above may further include evaluating the prototype model within the data science notebook application using a portion of the data.

Some examples of the method, system, and non-transitory computer readable medium described above may further include scoring additional data within the data science notebook application using the prototype model. Some examples of the method, system, and non-transitory computer readable medium described above may further include modifying one or more of the plurality of files based on the evaluation, wherein the production recipe is created based on the modification.

Some examples of the method, system, and non-transitory computer readable medium described above may further include identifying one or more library files based on a requirements file from the plurality of files, wherein the production recipe is generated based on the one or more library files. Some examples of the method, system, and non-transitory computer readable medium described above may further include evaluating the production model within the cloud-based ML platform using a portion of the training data.

Some examples of the method, system, and non-transitory computer readable medium described above may further include selecting additional data, scoring the additional data within the cloud-based ML platform using the production model, and generating one or more data insights within the cloud-based ML platform based at least in part on the scoring.

Some examples of the method, system, and non-transitory computer readable medium described above may further include publishing the production recipe to a cloud-based ML platform. Some examples of the method, system, and non-transitory computer readable medium described above may further include selecting the production recipe from a plurality of published recipes on the cloud-based ML platform.

Some examples of the method, system, and non-transitory computer readable medium described above may further include selecting training data. Some examples of the method, system, and non-transitory computer readable medium described above may further include selecting one or more parameters based on a configuration file of the production recipe. Some examples of the method, system, and non-transitory computer readable medium described above may further include training a production model within the cloud-based ML platform based on the production recipe, the training data, and the one or more parameters. Some examples of the method, system, and non-transitory computer readable medium described above may further include publishing the plurality of files to a version control service.

A method of authoring an enterprise machine learning (ML) recipe from a local notebook application is described. The method includes: creating a structured set of files for the enterprise ML recipe within the local notebook application, wherein the structured set of files is generated by a runtime environment within the notebook application based on a ML recipe template; developing a prototype ML model within the local notebook application using the structured set of files, including the steps of feature engineering, model engineering, and experimentation; and generating the enterprise ML recipe by operationalizing the prototype ML model within the local notebook application, wherein the operationalization includes containerizing the structured set of files, a set of library files, and the runtime environment.

In some cases, the method includes publishing the enterprise ML recipe to an online platform; and creating an enterprise ML model within the online platform based on the enterprise ML recipe. In some cases, the method includes identifying a programming language to be used for developing the prototype ML model; and selecting a kernel for the runtime environment based on the identified programming language.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on."

What is claimed is:

1. A method for developing a machine learning (ML) model, comprising:
    initiating, by a data science notebook application, a runtime environment, wherein the data science notebook application comprises a software application for documenting, visualizing, and iterating ML models;
    creating, by the data science notebook application, a plurality of files based on a notebook recipe template that includes a model of a file structure for the plurality of files, wherein the plurality of files includes a configuration file indicating hyperparameters for the ML model, a data loading file indicating training data to be loaded for a training stage, and a training file for training the ML model;
    generating, by the data science notebook application, a prototype model for the ML model by accessing the plurality of files through the runtime environment;
    generating, by the data science notebook application, a production ML package for the ML model by packaging the runtime environment and the plurality of files, the plurality of files including the configuration file, the data loading file, and the training file; and
    generating an enterprise ML model for the ML model by running the production ML package, wherein running the production ML package includes setting the hyperparameters, loading the training data, and training the enterprise ML model within the runtime environment.

2. The method of claim 1, further comprising:
    identifying a kernel of the data science notebook application; and
    selecting the runtime environment and the notebook recipe template based on the kernel.

3. The method of claim 1, wherein:
    the plurality of files is associated with a plurality of stages of a development process for the ML model; and
    the plurality of stages includes the training stage and stages associated with production, experimentation, evaluation, and packaging of the prototype model.

4. The method of claim 1, further comprising:
    loading training data based on the data loading file;
    loading a configuration from the configuration file;
    training the prototype model within the data science notebook application based on the training data and the configuration; and
    evaluating the prototype model within the data science notebook application using a portion of the training data.

5. The method of claim 4, further comprising:
    scoring additional data within the data science notebook application using the prototype model.

6. The method of claim 4, further comprising:
    modifying one or more files of the plurality of files based on the evaluation, wherein the production ML package is generated based on the one or more modified files.

7. The method of claim 1, wherein the plurality of files further includes a requirements file indicating a library to be used for performing functions associated with the ML model, the method further comprising:
    identifying one or more library files based on the requirements file, wherein the production ML package is generated based on the one or more library files.

8. The method of claim 7, further comprising:
    evaluating a production model that is based on the prototype model that has undergone steps for production, experimentation, and evaluation within a cloud-based ML platform using a portion of training data.

9. The method of claim 8, further comprising:
    selecting additional data; and
    scoring the additional data within the cloud-based ML platform using the production model.

10. The method of claim 9, further comprising:
    generating one or more data insights within the cloud-based ML platform based at least in part on the scoring.

11. The method of claim 1, further comprising:
    publishing the production ML package to a cloud-based ML platform;
    selecting the production ML package from a plurality of published production ML packages on the cloud-based ML platform;
    selecting training data;
    selecting artificial neural network weights based on the configuration file; and
    training a production model within the cloud-based ML platform based on the production ML package, the training data, and the selected artificial neural network weights.

12. The method of claim 1, further comprising:
    publishing the plurality of files to a version control service.

13. A system for developing an enterprise machine learning (ML) model within a notebook application, comprising:
    at least one processor and a memory storing instructions and in electronic communication with the at least one processor, the at least one processor being configured to execute the instructions to:
        create, via a data science notebook application, a prototype ML model using a plurality of files created by a runtime environment based on first training data and first model parameters, wherein the plurality of files includes a model of a file structure for the plurality of files, and wherein the plurality of files includes a configuration file indicating hyperparameters for the prototype ML model, a data loading file indicating training data to be loaded for a training stage, and a training file for training the prototype ML model;
        generate, via the data science notebook application, a production ML package for the prototype ML model by packaging the runtime environment and the plurality of files, the plurality of files including the configuration file, the data loading file, and the training file;
        distribute the production ML package to an ML platform; and
        generate an enterprise ML model within the ML platform by running the production ML package, wherein running the production ML package includes setting the hyperparameters, loading the training data, and training the enterprise ML model within the runtime environment, and wherein training the enterprise ML model includes training the enterprise ML model using second training data and second model parameters.

14. The system of claim 13, the system being further configured to execute the instructions to:
    identify a kernel of the data science notebook application; and select the runtime environment and a notebook recipe template based on the kernel.

15. The system of claim 13, the system being further configured to execute the instructions to:
score additional data within the data science notebook application based on the prototype ML model.

16. The system of claim 13, the system being further configured to execute the instructions to:
score additional data based on the enterprise ML model.

17. A method of authoring an enterprise machine learning (ML) package from a local notebook application, comprising:
creating, by the local notebook application, a structured set of files for the enterprise ML package, wherein the local notebook application comprises a software application for documenting, visualizing, and iterating ML models, wherein the structured set of files is generated within a runtime environment based on an ML package template, wherein the structured set of files includes a model of a file structure for the structured set of files, and wherein the structured set of files includes a configuration file indicating hyperparameters for a prototype ML model, a data loading file indicating training data to be loaded for a training stage, and a training file for training the prototype ML model;

developing, by the local notebook application, the prototype ML model using the structured set of files, including steps of feature engineering, model engineering, and experimentation;

generating, by the local notebook application, the enterprise ML package by packaging the runtime environment and the structured set of files; and generating an enterprise ML model by running the enterprise ML package, wherein running the enterprise ML package includes setting the hyperparameters, loading the training data, and training the enterprise ML model within the runtime environment.

18. The method of claim 17, further comprising:
publishing the enterprise ML package to an online platform; and
generating the enterprise ML model within the online platform.

19. The method of claim 17, further comprising:
identifying a programming language to be used for developing the prototype ML model; and
selecting a kernel for the runtime environment based on the identified programming language.

* * * * *